April 14, 1942.
G. C. GOODE ET AL
2,279,983
WINDSHIELD CLEANER
Filed Nov. 5, 1938
2 Sheets-Sheet 2
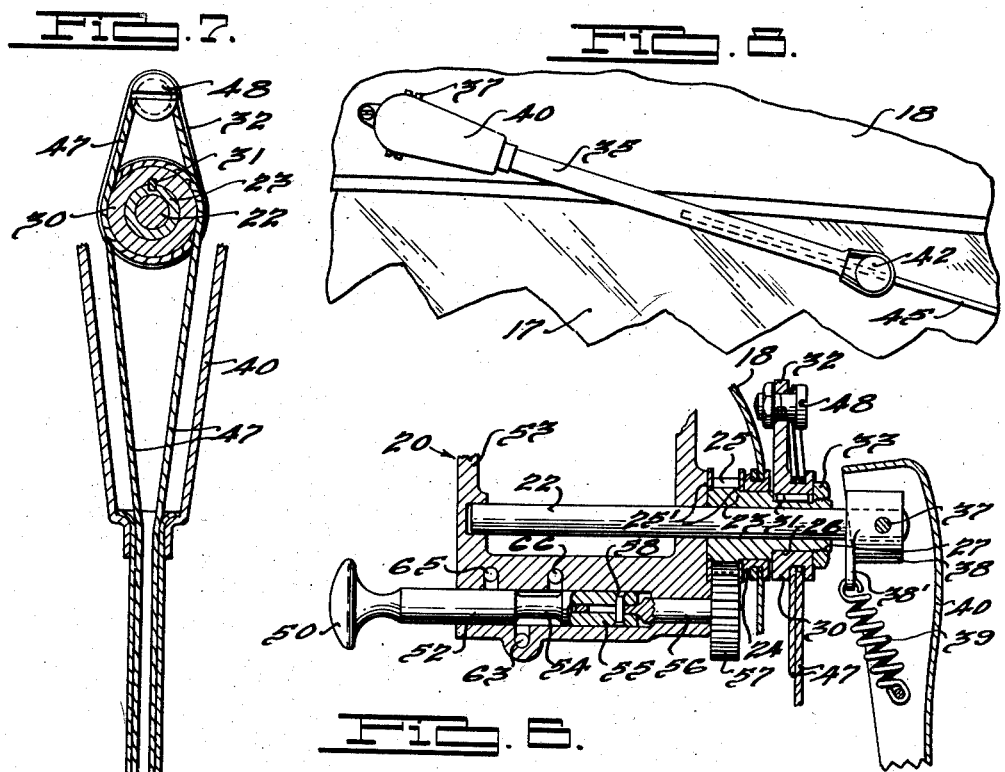
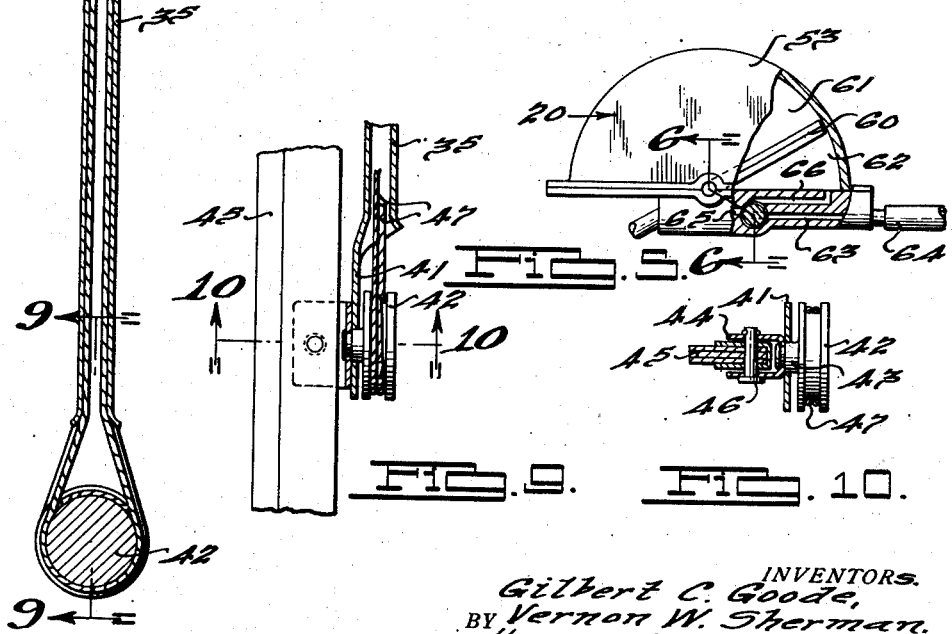
INVENTORS.
Gilbert C. Goode,
BY Vernon W. Sherman.
Harness, Lind, Paton & Harris
ATTORNEYS Patented Apr. 14, 1942

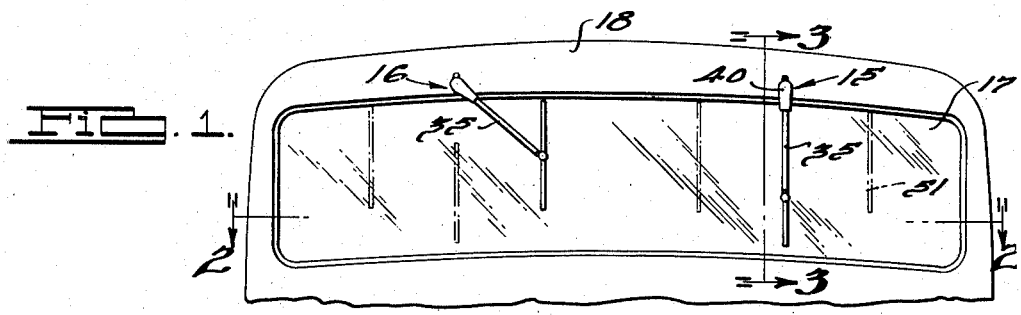

2,279,983

UNITED STATES PATENT OFFICE 2,279,983

WINDSHIELD CLEANER

Gilbert C. Goode, Birmingham, and Vernon W. Sherman, Detroit, Mich., assignors to Chrysler Corporation, Highland Park, Mich., a corporation of Delaware Application November 5, 1938, Serial No. 238,940

6 Claims. (Cl. 15—253)

This invention relates to improved window cleaners, and more particularly, to cleaners for cleaning curved windshields.

The principal object of the invention is to provide an improved windshield cleaner for curved windshields having an oscillatable cleaner element which is maintained substantially parallel to its normal central position while in operation so as to maintain throughout its contacting surface portions a uniform wiping pressure.

Further objects of the invention are to provide a cleaner of this character which has parking mechanism whereby the cleaner element can be conveniently parked out of the line of vision of the driver and the passengers in the vehicle and to provide a parking mechanism of this kind which is responsive to movement of the control button which controls the normal operation of the cleaner.

Other objects and advantages of the invention will be more apparent from the following description taken in connection with the accompanying drawings, in which:

Fig. 1 is a fragmentary, front elevational view of a vehicle embodying the invention.

Fig. 2 is a horizontal, sectional view taken as indicated by the line 2—2 of Fig. 1.

Fig. 3 is an enlarged, vertical sectional view taken as indicated by the line 3—3 of Fig. 1.

Fig. 4 is a substantially vertical sectional view taken as indicated by the line 4—4 of Fig. 3.

Fig. 5 is a substantially vertical sectional view taken along the line 5—5 of Fig. 3, a portion of the motor casing being broken away to show the construction of the motor.

Fig. 6 is an enlarged, sectional view taken approximately as indicated by the line 6—6 of Fig. 5.

Fig. 7 is an enlarged fragmentary view of the left-hand windshield cleaner with portions broken away to show the details thereof.

Fig. 8 is an enlarged elevational view of the left-hand windshield wiper in its parked position.

Fig. 9 is a vertical sectional view taken along the line 9—9 of Fig. 7.

Fig. 10 is a horizontal sectional view taken as indicated by the line 10—10 of Fig. 9.

In the form of the invention illustrated, the improved windshield cleaners 15 and 16 are substantially identical and therefore a description of one will be adequate. The cleaners 15 and 16 are illustrated as operating on a vehicle windshield 17 of a vehicle body 18 having laterally misaligned, successively adjacent surface portions. The improved cleaner may be made to satisfactorily operate on other types of windshields, such as those having aligned successively adjacent surface portions. The vehicle body includes a header member 19 which is spaced from the outer member of the top portion of the vehicle body to form a space 19'.

The improved windshield cleaner comprises a vacuum-operable motor 20 substantially enclosed within the space 19', and having a forwardly protruding shaft 22 which is rotatably mounted in a sleeve 23 which is journalled within a bearing member 24 carried within an aperture in the vehicle body. The sleeve 23 has an integral gear portion 25 formed thereon, and has a reduced end portion 26 which is threaded at 27 for the reception of a nut 33. Spaced bearing washers 25' are provided on each side of said gear portion. Keyed at 31 to the reduced portion 26 is a pulley 30 having a normally upwardly extending portion 32 (best shown in Fig. 6).

Pivotally mounted in the outer end of the shaft 22 by means of a threaded pin 37 is a tubular arm 35 having an enlarged upper shroud portion 40. A collar 38 is also mounted on the outer end of shaft 22 by means of the pin 37 and this collar has a downwardly extending portion 38' to which is connected one end of a coiled tension spring 39 as shown in Fig. 6. The other end of spring 39 is suitably connected to the arm 35 and the arm is thus yieldingly urged toward the windshield.

Arm 35 has a reduced end portion 41 (see Figs. 9 and 10) on which is mounted a rotatable pulley 42 having a hub 43 which extends through portion 41 and has a channel member 44 fixed to its opposite end. A cleaner blade member 45 is pin connected at 46 as is well known in the art.

A cable 47 extends through the tubular arm 35 and has operative pulleys 30 and 42 respectively. The ends of the cable are fastened to the upward extension 32 of the pulley 30 by a fastener 48 which may be loosened to adjust the tension on the cable or for other purposes.

It will thus be apparent that oscillation of the shaft 22 will in turn oscillate the arm 35 and, in turn, the blade 45. Because the pulley 30 is normally non-rotatable and the cable 47 is secured against travel by the fastener 48, the blade 45 will be maintained substantially parallel to its illustrated central position during the oscillating cycle.

The shaft 22 has a piston member 60 keyed thereto at the interior of the motor casing 53 (see Fig. 5). The motor is of the well known vacuum or suction type and has a valve chamber on its lower side in which an inwardly extending control member 50 is mounted for rotational and sliding movement. The member 50 has an integral stem 52 on which is formed a reduced portion 54. An extension 56 is disposed coaxially with the stem 52 and has a lost motion pin and slot connection therewith which is indicated at 58. It is obvious from the drawing that the member 50 may have a limited movement longitudinally of the casing 53 without effecting the position of the extension 56, but that rotational movement of the member 50 in either direction will cause a corresponding rotation of the extension 56.

It is of course understood that atmospheric pressure and suction from the intake manifold of the vehicle engine or other source are admitted to the interior of the motor 53, on either side of piston 60 alternately to drive the piston as is common in the art. The passage 63 (see Figs. 5 and 6) is connected to a suction line 64 and when the member 50 is pulled rearwardly (or to the left as in Fig. 6) as far as the pin 58 will allow, suction is admitted to passage 65 and it acts through the conventional valve mechanism of the motor (not shown) to oscillate the piston through an arc that is somewhat less than the maximum arc possible from the proportions of the parts as is well known in the art.

Passage 66 communicates directly with the valve chamber controlled by member 50 and one side of the piston chamber. When suction is admitted to passage 66, as shown in Fig. 6, it acts to pull the piston to its extreme oscillative position in that direction.

The extension member 56 has a gear 57 keyed on its outer end. Said gear 57 meshes with the gear 25 which is keyed on the sleeve 23.

It will thus be seen that when the member 50 is pulled to the left as viewed in Fig. 6, suction is on in passage 65 and the wiper arm 35 will be oscillated over the surface of the windshield glass 17, the spring 39 and cable 47 cooperating with their associated parts to maintain the blade 45 in smooth and even contact with the curved surface of the glass with a uniform pressure.

When it is desired to stop the oscillation of the blade 45, the member 50 is pushed outwardly or to the right as viewed in Fig. 6 and the parts will be in the position shown in Fig. 6. Suction is now on in passage 66 and it acts within the chamber portion 62 to pull the piston in a clockwise direction (as viewed in Fig. 5) to its extreme oscillative position. With the blade member 45 at 51, the vehicle driver turns the button 50 counterclockwise, as viewed from within the car, and the gear 57 rotates the gear 25 to swing the pulley 30 and its associated mechanism in a clockwise direction. This action rotates the blade member 45 by means of the cable 47 and permits the arm 35 and blade 45 to be swung to their parked position of Fig. 8 by the suction acting through the passage 66 where the windshield cleaner is out of the line of vision of the passengers in the car. When the blade member is in its parked position, the vacuum through the passage 66 assists in maintaining the piston 60 in its extreme position. When the vehicle operator desires to move the blade member from its parked position, he simultaneously rotates the button 50 clockwise and pulls it inwardly of the vehicle and the gear portion 25 rotates the blade member to its position of 51, closes the passage 66 and opens the passage 65 for normal operation of the windshield cleaner.

By maintaining the blade member 45 parallel with its illustrated central position, a straight blade member will satisfactorily clean a windshield that is curved in the lateral plane. If desired, the blade member may be curved to accommodate a windshield having a curvature in the vertical plane also. It is to be understood that the cleaner may be mounted on the side of the windshield to operate upon a windshield that is curved in the vertical plane.

The improved cleaner operates on all portions of a curved windshield with uniform force and may be parked and maintained in the parked condition substantially by the vacuum of the wiper engine. The cleaner is inexpensive and efficient, and inasmuch as its windshield-contacting portions exert substantially the same force, uniform wear and even operation of the cleaner blade and associated linkage is effected.

Although but one specific embodiment of the invention is herein shown and described, it will be understood that various changes in the size, shape and arrangement of parts may be effected without departing from the spirit of the invention.

We claim:

1. In a cleaner for a windshield having a curved surface, a vertically disposed wiper blade member for cleaning said surface, said wiper blade being adapted to be oscillated over said surface by means of an arm pivoted thereto and to a support outwardly of said surface, means for oscillating said blade member over said surface and for maintaining said blade member in its vertical position during said oscillation whereby said blade member has continuous straight line contact with said surface, comprising cable operated means.

2. A cleaner mechanism for cleaning the curved surface of vehicle windshields and the like comprising a motor, a shaft driven by said motor and adapted to be oscillated by said motor, an arm pivoted at one end to said shaft, a cleaner blade member pivoted at its center to said arm and disposed parallelly thereto when said arm is in its central position, means for maintaining said blade member parallel to its central position during oscillation of said arm and blade member comprising cable and pulley means cooperating with each other and with said arm and blade member to cause said blade member to oscillate about its pivot during the oscillation of said arm.

3. A cleaner for vehicle windshields and the like comprising a fluid pressure motor having a driven shaft adapted to be oscillated by said motor through a normal arc of operation, valve control means for controlling the admission of pressure fluid to said motor, said valve control means having two operative positions, movement to one of said positions causing normal operation of said motor and movement to the other of said positions causing oscillation of said shaft beyond said normal arc in one direction, an arm fixed at one end on said shaft, a cleaner blade member pivoted at its center to the other end of said arm in such a manner that it is parallel to said arm in the normal central position of said arm and blade, means for maintaining said blade parallel to its central position during oscillation of said arm and means cooperating with said valve control means for aligning said blade and said arm when said arm has been oscillated beyond the normal arc of operation.

4. A cleaner for a vehicle windshield and the like comprising a motor, an arm operatively connected to said motor for swinging movement relatively thereto, a cleaner blade member pivotally mounted on the swinging end of said arm, a pulley fixed to said blade member, a normally non-rotative pulley mounted on said motor and having its axis parallel with the axis of said first pulley, a cable operatively connecting said pulleys, and means for swinging said arm and said blade beyond their normal stroke including means for rotating said normally non-rotative pulley.

5. A windshield cleaner for a motor vehicle comprising a blade member, a fluid-operated motor having a forwardly extending shaft and including means for defining a normal stroke to said blade member, a sleeve rotatably mounted on said shaft and having a gear portion, a rearwardly extending push-pull control member adapted to function as a valve member for successively operating said motor or moving said blade member at least to one of the extremities of its normal stroke, a forwardly extending extension for said control member having a gear mounted thereon and meshed with said gear portion, a lost-motion connection between said control member and said extension, pulleys fixed to said sleeve and to said blade member respectively, said former pulley having a normally upwardly extending flange, and a cable extending around and operatively connecting said pulleys and having a portion secured to said pulley flange.

6. In a cleaner mechanism for vehicle windshields and the like; an arm, a cleaner blade pivoted to said arm and means including a motor for oscillating said arm through a normal arc of operation, a manually operable control member, said control member adapted to be longitudinally reciprocated for controlling the operation of said motor and means interconnecting said control member and said blade and operable upon rotation of said member to rotate said blade about its pivotal axis.

GILBERT C. GOODE.
VERNON W. SHERMAN.